United States Patent [19]

Garcea

[11] 3,916,682
[45] Nov. 4, 1975

[54] INSTRUMENT FOR INDICATING THE KILOMETRIC FUEL CONSUMPTION OF A MOTOR VEHICLE PROVIDED WITH AN INJECTION FEED EXPLOSION ENGINE

[75] Inventor: Giampaolo Garcea, Milan, Italy
[73] Assignee: Alfa Romeo S.p.A., Milan, Italy
[22] Filed: Sept. 18, 1973
[21] Appl. No.: 398,561

[30] Foreign Application Priority Data
Sept. 19, 1972  Italy .................................. 29408/72

[52] U.S. Cl. ................................. 73/114; 73/119 A
[51] Int. Cl.² .......................................... G01F 9/00
[58] Field of Search ................... 73/113, 114, 119 A

[56] References Cited
UNITED STATES PATENTS

| | | |
|---|---|---|
| 2,297,435 | 9/1942 | Schwager .............................. 73/113 |
| 2,330,159 | 9/1943 | Thompson ............................ 73/114 |
| 3,537,302 | 11/1970 | Marek et al. ......................... 73/114 |
| 3,716,035 | 2/1973 | Adler et al. ...................... 123/32 EA |
| 3,812,710 | 5/1974 | Bauman et al. ........................ 73/114 |

Primary Examiner—Jerry W. Myracle
Attorney, Agent, or Firm—Waters, Schwartz & Nissen

[57] ABSTRACT

A device is disclosed for indicating the consumption of fuel fed by injection into an explosion engine for driving a motor vehicle. Regulation means sensitive to the power delivered by the engine feed a signal for controlling the quantity of fuel fed at each engine cycle. Such a signal is also fed to an instrument, which is provided with at least one indication scale graduated in quantities of fuel delivered for a predetermined distance travelled by the vehicle when a determined gear is inserted.

3 Claims, 1 Drawing Figure

U.S. Patent Nov. 4, 1975 3,916,682
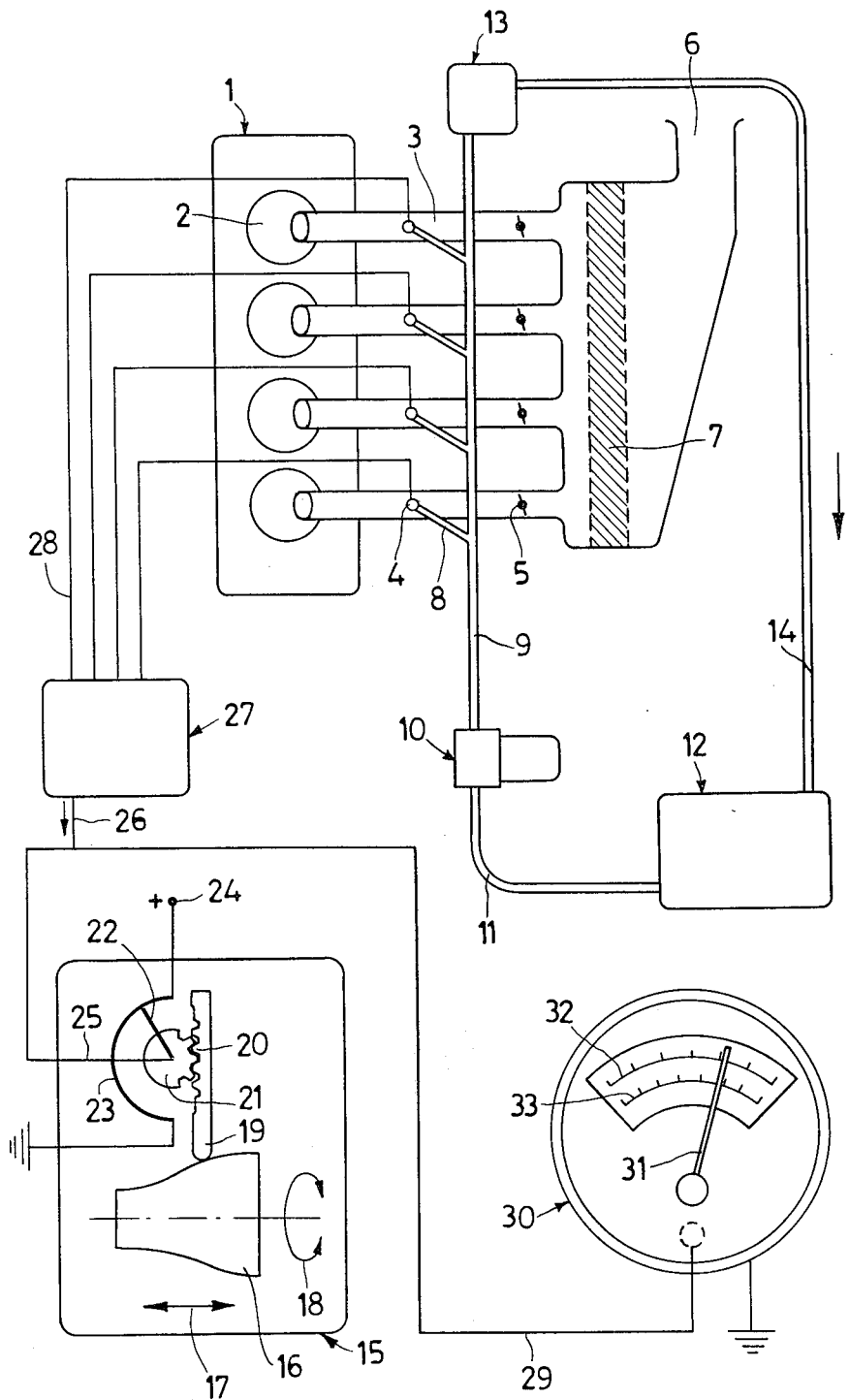

INSTRUMENT FOR INDICATING THE KILOMETRIC FUEL CONSUMPTION OF A MOTOR VEHICLE PROVIDED WITH AN INJECTION FEED EXPLOSION ENGINE

This invention relates to a device for instantaneously indicating the kilometric fuel consumption of a motor vehicle provided with an injection feed explosion engine under the various conditions of motor vehicle use. In explosion engines of the injection type, the feed system comprises a delivery assembly for feeding fuel to the various cylinders, and a regulator which, in relation to the operating conditions of the engine, acts on the delivery assembly with a signal which determines the rate of feed.

It has now been found that this signal fed to the regulator in the form of a physical, mechanical or electrical quantity, according to the type of system, besides being used to dose the fuel injected into the engine, can also be used for obtaining an indication of the fuel consumption on an instrument.

The instrument can provide an indication which represents the fuel consumed in an interval of time or the consumption referred to a kilometric distance; however an indication of the second form is undoubtedly preferable because it is more significant from the practical point of view and because it is more familiar, having entered into common use.

Furthermore from the constructional point of view it is possible to construct a more simple instrument, because an indication of consumption referred to a kilometric distance can be measured using only the physical quantity G provided by the regulator, a quantity which is proportional to the feed, i.e. to the quantity of fuel q which is introduced into a cylinder of the engine at each cycle. This appears clearly from the following examination of the relationship in this case between the kilometric consumption Q and the physical quantity G; if:

$q$ = fuel feed (in mm³/cycle)
$z$ = number of engine cylinders
$a$ = number of strokes in a cycle
$G = K_1 q$
$N$ = speed of drive shaft expressed in r.p.m.
$r$ = gear ratio in relation to the particular gear inserted
$r_p$ = axle ratio
$D$ = wheel diameter in metres $$K = \frac{60}{1000} r_p \pi D = \text{a constant value characteristic of the motor vehicle transmission.}$$

The ratio of the quantity of fuel (expressed in litres) introduced into the engine in a predetermined unit time interval to the distance (expressed in km) travelled by the motor vehicle in the same time interval gives the kilometric consumption Q which is evidently given by the formula:

$$Q = \frac{2.10^{-6} q \frac{z}{a} N}{N K r} = \frac{2.10^{-6} z G}{K K_1 a r} \text{(litres/km)}.$$

Hence the value of the kilometric consumption Q is related to the value of the physical quantity of the adjustment signal G by a simple proportional relationship when a determined gear is inserted for a determined vehicle:

$Q = K_2 G$ where $$K_2 = \frac{2.10^{-6} z}{K K_1 a r}$$

assumes a different value for each value of the transmission ratio of the motor vehicle gear box.

Obviously as the kilometric consumption Q is different according to the gear inserted, the corresponding indication $W_Q$ provided by the measuring instrument must be different.

On the basis of these considerations an instrument with a mobile pointer can be constructed provided with one or more scales for numerical indications, each scale being defined by the value which the said constant $K_2$ assumes for each of the gear box transmission ratios. For a certain gear inserted, the indication $W_Q$ of the kilometric consumption is read on the scale relative to that gear.

Preferably the indicating instrument is of the electrical type and utilises a quantity G proportional to the fuel fed at each cycle (9) which is provided by the regulator in the form of voltage or current, thus if the engine is provided with an electronic injection system, the quantity G can very easily be fed to the instrument; if however the engine has a mechanical injection system the signal provided by the regulator is a mechanical quantity and a mechanical-electrical transducer is necessary for transforming it into the electrical quantity G. In the embodiment described hereinafter, relative to an electronic injection system, the same electrical quantity as supplied by the regulator of the injection system arrives directly at the instrument, in the instrument said quantity is used for moving the pointer relative to the scale (or scales) drawn on the instrument dial.

In the same embodiment reference is also made to the case of an engine in which the regulator of the injection system is of the three-dimensional cam and follower type; the cam memorises on its surface the carburation requirements of the engine, and the follower is kinematically associated with its surface, an electrical transducer being associated with the follower so that the position of the follower due to the lift of the point of the cam surface with which it is in contact determines the value of the electrical regulating dimension G which represents the quantity of fuel q introduced into one cylinder at each engine cycle; it is the same electrical quantity G which is utilised by the instrument.

The accompanying FIGURE shows schematically an indicator device according to the invention, applied to an engine equipped with an electronic injection system.

The explosion engine is indicated overall by the reference numeral 1, and the four cylinders indicated by the reference numeral 2 and their relative feed ducts 3 can be seen; in the ducts 3 are disposed the electroinjectors 4 and the throttle valves 5. The engine air intake is indicated by the reference numeral 6 and the intake filter-silencer by 7.

The ducts 8 for feeding petrol to the electroinjectors 4 branch from the delivery pipe 9 of the pump 10; the suction pipe of the pump, deriving from the tank 12, is indicated by the reference numeral 11, a pressure regulating valve for the petrol supplied to the electroinjectors is indicated by the reference numeral 13, and the discharge pipe of the valve 13 is indicated by the reference numeral 14.

The regulator of the injection system of the spacial cam and follower type is indicated overall by the reference numeral 15. The cam 16, the outer surface of which memorises the carburation programme of the engine, is moved in the direction of its axis and also about it, as shown by the arrows 17 and 18, by means (not shown) sensitive respectively to the speed of rotation of the engine and to the angular position of the throttle valve. The follower 19 is kept in engagement with the surface of the cam 16 and is guided so that it moves in the direction of its axis and assumes a different position according to the relative lift at the point of the surface of the cam with which it is in contact.

The follower 19 carries the rack 20 which engages with the gear wheel 21 rigid with the cursor 22 of the potentiometer 23; the potentiometer is connected to a current supply by way of the terminal 24, and its cursor 22 is connected to the cable 25. The intensity of the current which flows through the cable 25 is determined by the axial position of the follower 19 and hence corresponds to the quantity of fuel q which must be injected into the engine.

The signal supplied by the regulator 15 arrives by way of the cable 26 at the processor 27 which emits control signals for opening and closing the electroinjectors 4, the duration of energisation of the coils of the electroinjectors, fed by cables 28, being determined by the feed value q.

The signal supplied by the regulator 15 is also fed through the cable 29 to the electrical circuit (not shown because it is of known type) of the indicator instrument 30.

The intensity of the current which flows through it determines the degree of deviation of the moving element (associated with the circuit) rigid with the pointer 31.

The dial of the instrument carries graduated scales on which the kilometric consumption of the motor vehicle is read; the size of the divisions of each scale is determined by the value of the constant $K_2$ of the previously examined relationship between the kilometric consumption Q and the dimension G proportional to the feed $q$, for a certain transmission ratio of the motor vehicle gear box.

In this particular case there are two scales and they are indicated by the reference numerals 32 and 33; the numerical indications of the first scale (for example expressed in 1/km or 1/100 km) represent the kilometric consumption of the motor vehicle corresponding to operation in fifth gear, while the indications on the second scale correspond to operation in fourth gear.

What I claim is:

1. A device for indicating the kilometric fuel consumption of a motor vehicle with an internal combustion engine having an injection fuel feed system, comprising in combination, regulation means sensitive to the power supplied by the engine and delivering an electric signal proportional to the quantity of fuel fed at each engine cycle, indicating means operatively connected to said regulation means for providing an indication of the kilometric fuel consumption of the motor vehicle, said indicating means having at least one indicating scale graduated in quantities of fuel delivered for a predetermined distance traveled by said vehicle when a predetermined gear is engaged, said regulation means comprising a three-dimensional cam, a follower engaging the cam surface, and a mechanical-electrical transducer of potentiometric type supplied with direct current and operatively connected to the follower, said cam being axially and angularly displaceable as a function of two engine operating parameters, the lifts of said cam representing the fuel requirements of the engine in the different operating conditions, the voltage across said potentiometric transducer being proportional to the quantity of fuel fed at each engine cycle and actuating the indicating means to supply the indications of the motor vehicle kilometric fuel consumption on the indicating scale relating to the engaged gear.

2. A device as claimed in claim 1, wherein said indicating means has a plurality of indicating scales, each graduated in quantities of fuel delivered for a predetermined distance travelled by said vehicle when a predetermined gear is engaged.

3. A device as claimed in claim 1, wherein said regulation means is also operatively connected to said injection fuel feed system.

* * * * *